United States Patent
Lin et al.

(10) Patent No.: US 11,663,548 B2
(45) Date of Patent: May 30, 2023

(54) SYSTEM AND METHOD FOR RAPID DEFECT ENTRY

(71) Applicant: Toyota Motor Engineering & Manufacturing North America, Inc., Plano, TX (US)

(72) Inventors: Yang Lin, Waterloo (CA); Cliff Morrison, Cambridge (CA); Peter A. Couto, Cambridge (CA); David W. van Heugten, Kitchener (CA); Josh Reid, Stratford (CA); James Lean, Ariss (CA); Jeremy M. Taylor, Baden (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/106,742

(22) Filed: Nov. 30, 2020

(65) Prior Publication Data

US 2022/0172145 A1 Jun. 2, 2022

(51) Int. Cl.
*G06Q 10/06* (2023.01)
*G07C 3/14* (2006.01)
(Continued)

(52) U.S. Cl.
CPC ..... *G06Q 10/06395* (2013.01); *G06F 3/0482* (2013.01); *G06F 16/2379* (2019.01);
(Continued)

(58) Field of Classification Search
CPC .............. G06Q 10/06395; G06Q 30/018
See application file for complete search history.

(56) References Cited

U.S. PATENT DOCUMENTS 6,763,130 B1    7/2004   Somekh et al.
6,871,326 B1 *   3/2005   Kazemi ................ G06Q 10/087
                                                   715/804

(Continued)

FOREIGN PATENT DOCUMENTS

DE    102018008366 A1   5/2020
WO    2019238890 A1   12/2019

OTHER PUBLICATIONS

ATS Inspect Visual Quality. Attribute Data Collection: Article 3. Tracking Defects in Toyota from www.ats-inspect.com 2012 (Year: 2012).*

(Continued)

*Primary Examiner* — Johnna R Loftis
(74) *Attorney, Agent, or Firm* — Christopher G. Darrow; Darrow Mustafa PC

(57) ABSTRACT

A defects management system includes a server, a mobile computing device, and a local hub. The server has a database configured to store a plurality of records that respectively correspond to a plurality of products in an inspection line. The mobile computing device is configured to receive user input indicating a location of a defect on a selected product among the plurality of products. The local hub, in communication with the server, is configured to receive the user input from the mobile computing device and update a record among the plurality of records that corresponds to the selected product to include a defect indication in accordance with the user input.

9 Claims, 5 Drawing Sheets

(51) Int. Cl.
  *G06Q 10/08* (2023.01)
  *G06Q 10/0639* (2023.01)
  *G06F 16/23* (2019.01)
  *G06Q 10/087* (2023.01)
  *G06F 3/0482* (2013.01)
  *G06Q 10/101* (2023.01)
  *G06Q 50/04* (2012.01)
  *H04W 8/18* (2009.01)
  *G06Q 10/20* (2023.01)
  *G06Q 10/0631* (2023.01)

(52) U.S. Cl.
  CPC ..... *G06Q 10/06316* (2013.01); *G06Q 10/087* (2013.01); *G06Q 10/101* (2013.01); *G06Q 10/20* (2013.01); *G06Q 50/04* (2013.01); *G07C 3/143* (2013.01); *H04W 8/186* (2013.01)

(56) References Cited

U.S. PATENT DOCUMENTS

| | | | | |
|---|---|---|---|---|
| 7,020,580 | B2* | 3/2006 | Peters | G06F 11/321 |
| | | | | 714/48 |
| 8,744,886 | B1 | 6/2014 | Mishra et al. | |
| 8,983,172 | B2* | 3/2015 | Steffenson | G06T 7/75 |
| | | | | 382/141 |
| 10,802,481 | B1* | 10/2020 | Menon | G06F 8/71 |
| 10,977,734 | B1* | 4/2021 | Kenney | G06Q 40/08 |
| 2007/0225931 | A1 | 9/2007 | Morse et al. | |
| 2008/0016119 | A1 | 1/2008 | Sharma et al. | |
| 2008/0208381 | A1* | 8/2008 | Soga | G06Q 10/06 |
| | | | | 700/110 |
| 2010/0234976 | A1 | 9/2010 | Kostyk et al. | |
| 2014/0142868 | A1* | 5/2014 | Bidaud | G01N 21/8803 |
| | | | | 702/34 |
| 2016/0033962 | A1* | 2/2016 | Cote | G05B 19/41885 |
| | | | | 700/29 |
| 2016/0239584 | A1 | 8/2016 | Steele, Jr. | |
| 2016/0267421 | A1 | 9/2016 | Kymal et al. | |
| 2018/0343140 | A1* | 11/2018 | Driedger | H04L 12/2818 |
| 2019/0034878 | A1* | 1/2019 | Siegel | G06Q 10/06311 |
| 2020/0186689 | A1* | 6/2020 | Outwater | H04N 5/2258 |
| 2021/0126956 | A1* | 4/2021 | Huang | H04L 65/4053 |

OTHER PUBLICATIONS

*Bascom Global Internet Services, Inc.* v. *A&T Mobility LLC*, 827 F.3d 1341 (Fed. Cir. 2016), 26 pages.

* cited by examiner

SYSTEM AND METHOD FOR RAPID DEFECT ENTRY

TECHNICAL FIELD

The subject matter described herein relates generally to a system and method for rapid entry and recordation of defects in an assembly process, and more particularly to a system that facilitates rapid, coordinated action in identifying and addressing product defects by various users that may be distributed across multiple work stations.

BACKGROUND

Product inspection for defects is a common part of a manufacturing process. For example, vehicles in an assembly plant may be placed on an inspection line along which multiple inspection teams check the vehicles for defects, e.g., in a topcoat paint job. Typically, an inspection team will note defects of a vehicle on paper, e.g., an inspection form or a notebook. Individual team members may update the status of the defects over the course of a process which includes multiple teams helping to repair the defects. A final team usually enters the results in a quality system database at the end of the inspection and repair process. Some facilities may include a computer station at which team members can enter/update defect status, however, such stations require team members to go back and forth between the product and their station.

SUMMARY

The disclosed systems and methods relate to a defects entry system that can facilitate rapid entry of defects by multiple individuals who may be functioning in different roles and in different locations within a manufacturing facility. Compared to conventional methods, the disclosed defects entry system can improve, among other things, real-time traceability of defect status, speed at which a large amount of defects may be recorded/updated, and synchronization in collaboration among multiple teams.

In one embodiment, a defects entry system includes a server having a database configured to store a plurality of records that respectively correspond to a plurality of products in an inspection line, a mobile computing device configured to receive user input indicating a location of a defect on a selected product among the plurality of products, and a local hub, in communication with the server, that receives the user input from the mobile computing device and updates a record among the plurality of records that corresponds to the selected product to include a defect indication in accordance with the user input.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments disclosed herein are associated with a defects management system that provides rapid defect inspection logging, rapid defect repair logging, a collaborative repair mode, and virtual vehicle queue tracking while also providing real-time status information to team members regarding the inspection state of a product in an inspection process. Implementations of the disclosed defects management system can be applied, for example, to a manufacturing plant or assembly facility in which individuals at multiple stations perform certain tasks to advance production or inspection of a product, such as a vehicle, appliance, electronic device, etc. For the sake of simplifying the disclosure, an example implementation will be described for managing defects inspection/repair in a vehicle manufacturing operation. However, it should be understood that the disclosed embodiments can be applied to other products and used in other implementations.

Figure 1:
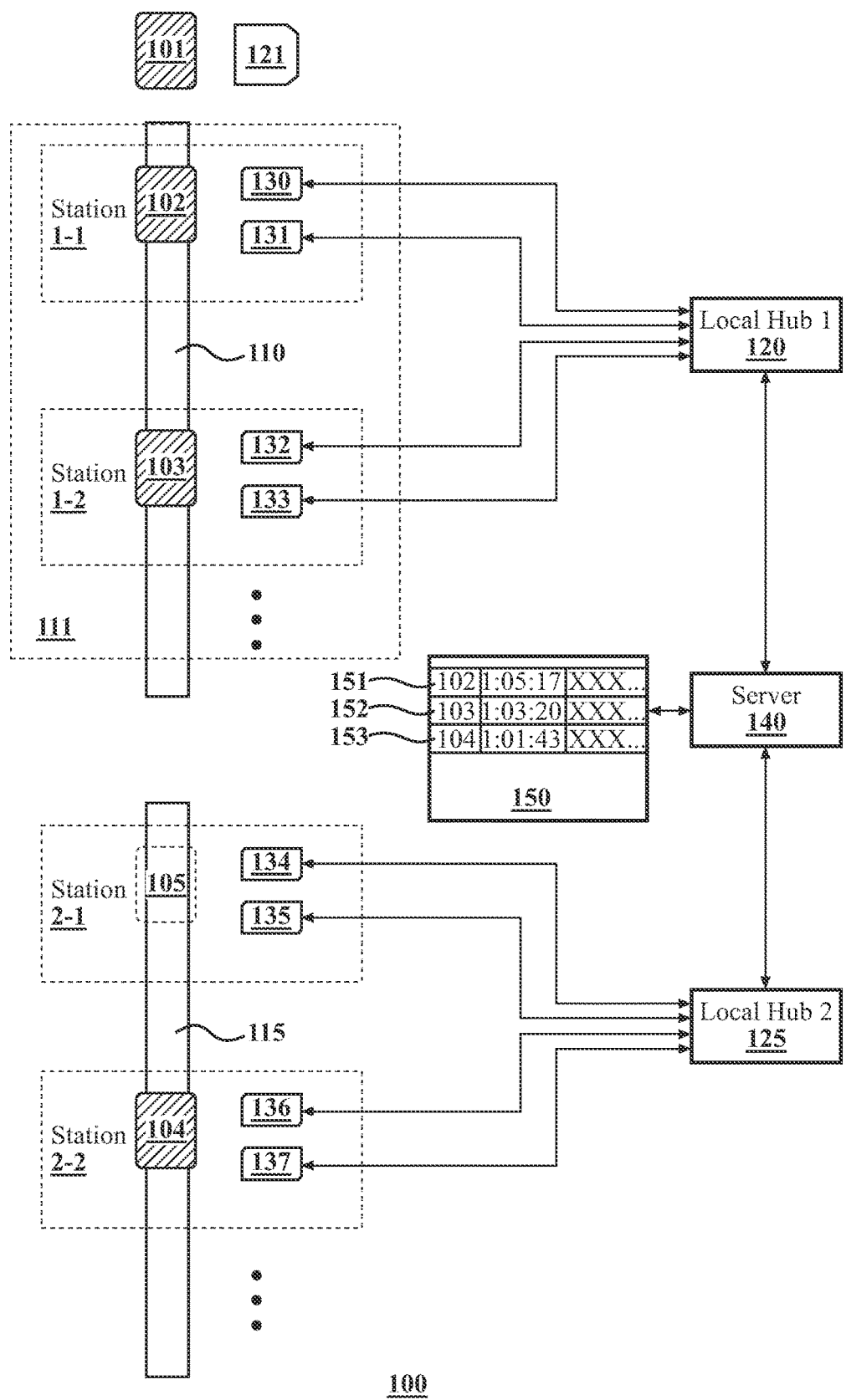
FIG. 1 illustrates one embodiment of a facility layout in which systems and methods disclosed herein may be implemented.

FIG. 1 shows an example interior layout of a quality control facility, that can implement the disclosed defects management system 100. In one or more implementations the facility includes one or more conveyor lines (e.g., 110, 115) that move products (e.g., 101, 102, 103, 104) past one or more work stations (e.g., station 1-1 . . . 1-n, station 2-1 . . . 2-n). The disclosed defects management system 100 includes one or more local hub servers 120, 125 (local hubs) in communication with a main server 140 and a plurality of mobile computing devices 130-137.

In one or more embodiments, each of local hubs 120, 125 is associated with one or more team member workstations where team members inspect/repair different aspects of vehicles as the vehicles move down the conveyor lines 110, 115. For example, local hub 120 is associated with work stations 1-1, 1-n, . . . , while local hub 125 is associated with workstations 2-1, 2-n, . . . , and so on. Although only two local hubs 120, 125 are shown, more can be included according to the size of the operation and number of workstations established. In one or more embodiments, the local hubs 120, 125 can provide a web service that, for example, manages client connections, places clients in groups, and broadcasts updates to team member groups as needed.

The local hubs 120, 125 are communicably connected to the main server 140 which stores a database 150 of records (e.g., 151-153). Each record corresponds respectively to products (e.g., 102-104) currently under inspection/repair. As mentioned above, for simplification purposes the products 101-104 will hereafter be referred to as 'vehicles 101-104'.

In one or more implementations, when new vehicle 101 enters the disclosed defects management system 100, a reader 121 captures information associated with the new vehicle 101, for example, a vehicle identification number (VIN), one or more images, model, etc. The reader 121 creates a new record in the database 150 of the main server 140. In one or more embodiments, the reader 121 can timestamp each new record 151-153.

The data structure of the record can be configured according to the aspects of the product being inspected. For example, in the case of a vehicle inspection implementation, in addition to timestamp information the data structure of the record can include an array of variables corresponding to make, model, color, VIN, etc., of the vehicle, as well as corresponding diagrams, digital models or figures for facilitating defect entry, as will be discussed further below.

The disclosed defects management system 100 includes mobile computing devices 130-137 that can be used, e.g., by inspection team members, to log defects and update the status of the defects in a coordinated manner. As will be described below, the mobile computing devices 130-137 communicate with respective local hubs 120, 125 to provide improved defect logging, collaboration and status updating functions.

Figure 2:
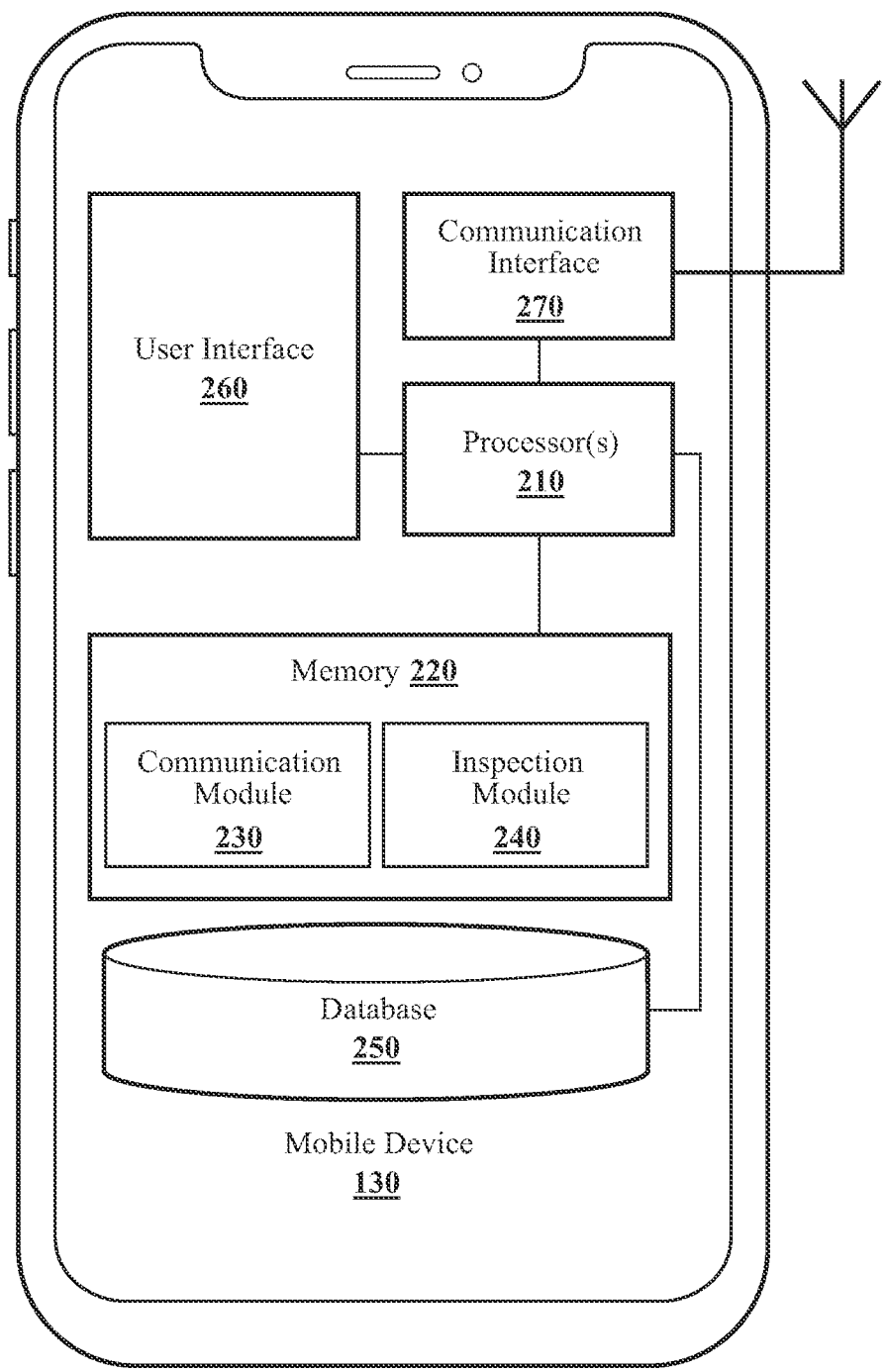
FIG. 2 illustrates one embodiment of a mobile computing device according to the disclosed embodiments.

FIG. 2 shows an example implementation of a mobile computing device 130. In one or more embodiments the mobile computing device 130 can be implemented, for example, as a cell phone, personal digital assistant (PDA), tablet, laptop, notebook, wearable computing device or other mobile computing device. Generally, the mobile computing device 130 includes a user interface 260, such as one or more of a screen, a touchscreen, a keyboard, keypad, a microphone, a speaker, etc., that allows the mobile computing device 130 to display information to a team member and receive input (e.g., login credentials, defect entries, etc.) from the team member.

The mobile computing device 130 also includes multiple other elements, including one or more processors 210 and a database 250. The database 250 is configured with routines that can be executed by the processor 210 for analyzing stored data, searching stored data, organizing stored data, and so on. The database 250 can provide, among other functions, a buffer space to store a plurality of records associated with vehicles currently in an inspection line. In one or more embodiments, the database 250 can temporarily store data such as vehicle record data, defect entries and other data described above, as well as data used by the modules 230 and 240 in executing various functions as described below.

Additionally, in one or more embodiments the mobile computing device 130 includes a memory 220 that stores a communication module 230 and an inspection module 240. The memory 220 can be implemented as a random-access memory (RAM), a read-only memory (ROM), a flash memory, or other suitable memory for storing the modules 230 and 240. The modules 230 and 240 are, for example, computer-readable instructions that when executed by the processor 210 cause the processor 210 to perform the various functions disclosed herein. In various embodiments, the modules 230 and 240 can be implemented in different forms that can include but are not limited to hardware logic, an ASIC, components of the processor 210, instructions embedded within an electronic memory, and so on.

The communication module 230 is constructed including instructions that function to control the processor 210 to communicate with a local hub, establish a subscription relationship with the local hub, and retrieve/receive updated information from the local hub.

The inspection module 240 is constructed including instructions that function to control the processor 210 to cause the user interface 260 to display various interfaces for viewing records in accordance with a team member's position on the line and for progressing through a vehicle queue, as well as provide interfaces for an inspection function, an inline repair function, an offline repair function, and a gaps management function. These functions will be described in further detail below.

The mobile computing device 130 includes a communication interface 270 that allows the mobile computing device 130 to transmit/receive data and communicate with a local hub (e.g., 120 or 125) and/or other entities, such as communication networks, server systems, and other systems. The communication interface 270 can be implemented as, for example, a wireless communication system including one or more transmitting/receiving devices, one or more transmitting/receiving antennas and a controller for transmitting and receiving data over a wireless network using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), 5G, High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or other wireless protocol.

A general example including details of an operational flow of the disclosed defects management system 100 will now be provided. Referring back to FIG. 1, the reader 121 scans incoming vehicles (e.g., 101-104) and creates records (e.g., 151-153) in the main server 140 database 150 for each vehicle that is scanned. The records are persistent and can be accessed by local hubs (e.g., 120, 125).

After being scanned and having a record created, vehicles enter the conveyor line 110 for inspection/repair. Since the reader 121 reads each vehicle in real-time as the conveyer line 110 moves, the reader 121 automatically synchronizes new entries with the task time for each station in each line process. For example, if station 1-1 takes 75 seconds to complete a job as part of the inspection process pipeline, then every 75 second the conveyer moves to the next vehicle on the pitch, and this task time is captured in the sequential timestamps of consecutive vehicles.

After a vehicle is read in, the conveyor line 110 moves the vehicle from station to station, e.g., from station 1-1 to station 1-2 to station 1-*n*, and so on. Each station can have different tasks and one or more associated mobile computing devices 130-137 that team members at the stations can us for defect entry and other functions related to the assigned task. For example, as shown in FIG. 1, station 1-1 has associated mobile computing devices 130 and 131, and so on. A team member (e.g., inspector, technician, repair person, etc.) at station 1-1 can utilize the mobile computing device 130 to obtain a record associated with the vehicle 102 that is currently at the station 1-1 and to enter or update defect/repair status to be stored in the database 150 in association with the record.

A plurality of workstations can form a 'section' that is associated with a local hub. For example, workstations 1-1 and 1-2 may be classified as 'section 1' (i.e., FIG. 1 section 111) and associated with local hub 120, workstations 2-1 and 2-2 may be classified as 'section 2' and associated with local hub 125, and so on. By utilizing local hubs (e.g., 120, 125), the disclosed defect management system 100 can maintain a full database 150 of vehicle records while separately providing mobile computing devices in each section relevant local services that do not require persistence or universal access, such as gap management and group management.

To interact with the disclosed defect management system 100, a team member can register an account with the system 100 (e.g., the main server 140). The account information can include, for example, the team member's username/ID, password, full name, position, assigned station, task, etc. To enter defects, the team member can log on to the system 100 as a client via a mobile computing device, for example, mobile computing device 130.

At the end of the login process, the mobile computing device 130 (e.g., communication module 230) establishes a client connection with the local hub 120. In response, the local hub 120 requests details about the client, such as which section the client is assigned to. The communication module 230 responds by sending the required details and thereafter maintains a live connection with the local hub 120, allowing real-time data transfer.

The local hub 120 determines whether the client should be added to an existing group of clients or to a new group that needs to be created for the client. For example, if the client is the first to log on from section 111, the local hub 120 can create a new group for section 111, add the client to the new group and initiate an update timer for the group, as discussed further below. If instead one or more clients in section 111 have already logged on and are currently in an existing group, the local hub 120 can add the client to the existing group.

In any case, the client is included in an appropriate group that subscribes to a section for updates and information.

The local hub 120 (and similarly other local hubs) can build a 'vehicle queue' for a section by retrieving from the server 140 database 150, in real-time, data indicating the last N number of vehicles that were read in. The vehicle queue is a list of records corresponding sequentially to vehicles that have passed through a section. The local hub 120 determines a first vehicle record in the vehicle queue by identifying the most recent vehicle to have been tracked into the section. The local hub 120 populates the remainder of the vehicle queue by obtaining, from the server database 150, records associated with previous vehicles scanned in up until that point in time until the number of records equals a threshold value, i.e., 'QUEUE_SIZE.' The QUEUE_SIZE threshold caps the number of records that the local hub 120 obtains from the server 140 and prevents excessive data transmission that may slow communication rates and increase latency in the defect management system 100.

In one or more embodiments, the local hub 120 can build the vehicle queue in reference order from the oldest vehicle to the newest vehicle such that the vehicle queue order matches a direction the vehicle is travelling on the conveyor line 110 and/or matches a direction each vehicle is facing. In one or more embodiments, the local hub 120 can set a value, e.g., QUEUE_START, to determine how many vehicles from a tracking point to start the queue. Setting QUEUE_START can be useful, for example, when a tracking point is relatively far from the start of the section.

In one or more embodiments, each local hub updates all existing corresponding groups in a recurring update process. For example, in one or more embodiments the local hub 120 can take a temporary 'snapshot' of a group (e.g., mobile computing devices 130-133) in case the update is a long running process. The local hub 120 can determine a new vehicle queue and check for any differences between the new vehicle queue and the previous vehicle queue, such as a difference in total count, new or missing vehicle IDs, or a change to defect/repair status. The local hub 120 can insert any gaps in the existing queue (discussed below) into the updated queue as needed. Any time the local hub 120 detects an update to a vehicle's defect list, the hub updates the vehicle defect list in the server 140.

The local hub 120 can execute the update process on a timer, e.g., a 5-second interval. However, to prevent multiple updates running simultaneously the local hub 120 can restart the timer after the update process completes, instead of strictly starting an update process every five seconds.

Figure 3:
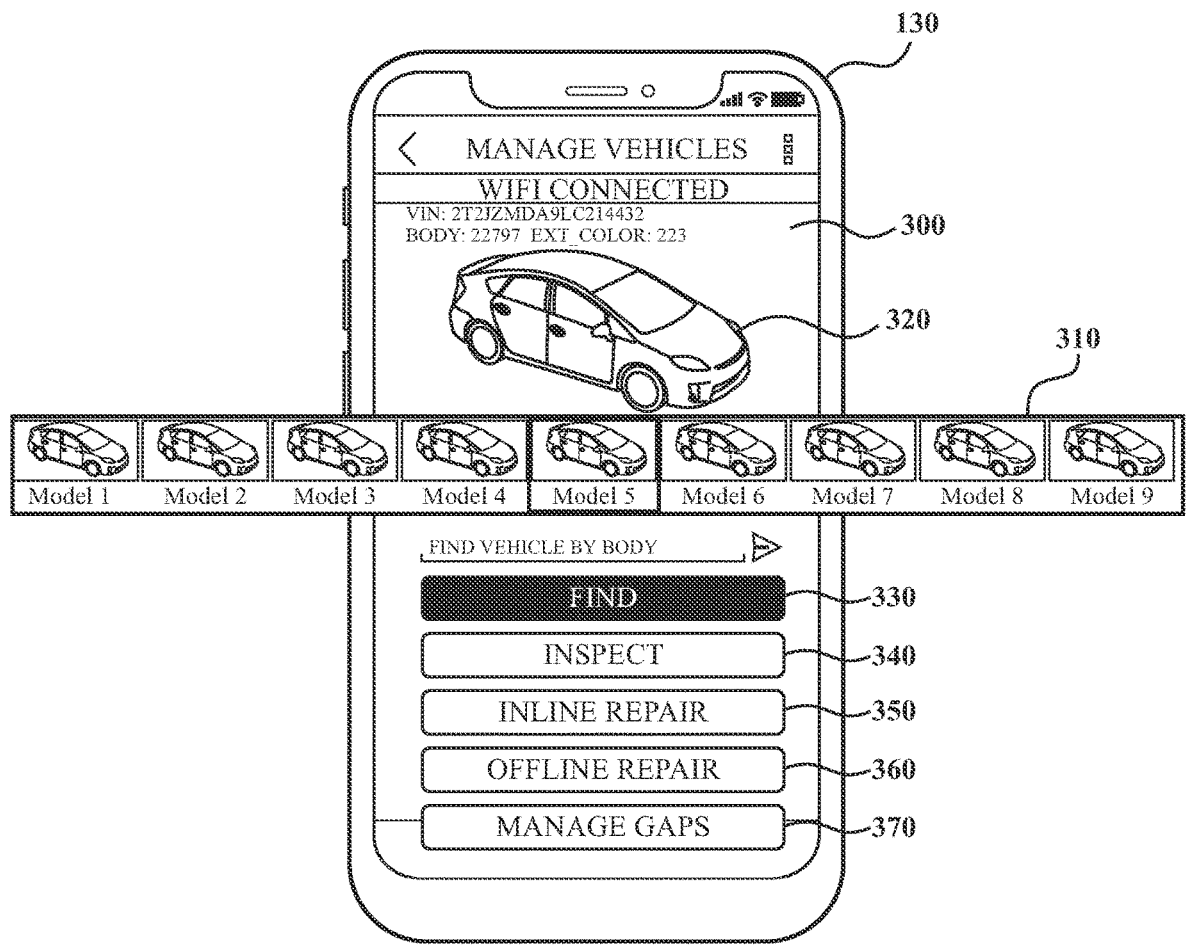
FIG. 3 illustrates one embodiment of a main interface of a mobile computing device according to the disclosed embodiments.

FIG. 3 shows an example main interface 300 on a mobile computing device showing a portion of the vehicle queue. For example, referring to FIGS. 1 and 3, a team member at workstation 1-1 can login using mobile computing device 130, which is assigned to workstation 1-1. Based on the assignment, the mobile computing device 130 can determine which section the mobile computing device 130 is in, determine a pitch offset according to how many pitches (e.g., workstations) the mobile computing device 130 is away from the reader 121 location, and communicate this information to the local hub 120. Based on the pitch offset, the local hub 120 can transmit a portion of the vehicle queue 310 to the mobile computing device 130. The mobile computing device 130 can automatically center the received vehicle queue to highlight the correct vehicle 320 (e.g., 102) that is currently in front of the team member.

As vehicles continue to move down the line 110, the mobile computing device 130 can keep track of which vehicle is right in front of the team member based on the vehicle queue updates from the local hub 120. This automatic tracking function helps the team member to quickly enter inspection/repair information for a vehicle currently at a workstation.

Furthermore, as shown in FIG. 3, the mobile computing device 130 can display a main interface 300 that provides a team member with multiple options, including manually scrolling through the vehicle queue 310 (e.g., in case the team member is asked to attend to a different workstation in order to aid inspection/repair of another vehicle), a find function 330 to search for specific vehicles, an inspect function 340 to enter defects, an inline repair function 350 to allow collaboration in repairing defects, an offline repair function 360 to allow for updates in offline repairs, and a manage gaps function 370 to manage gaps in the conveyor line.

Figure 4:
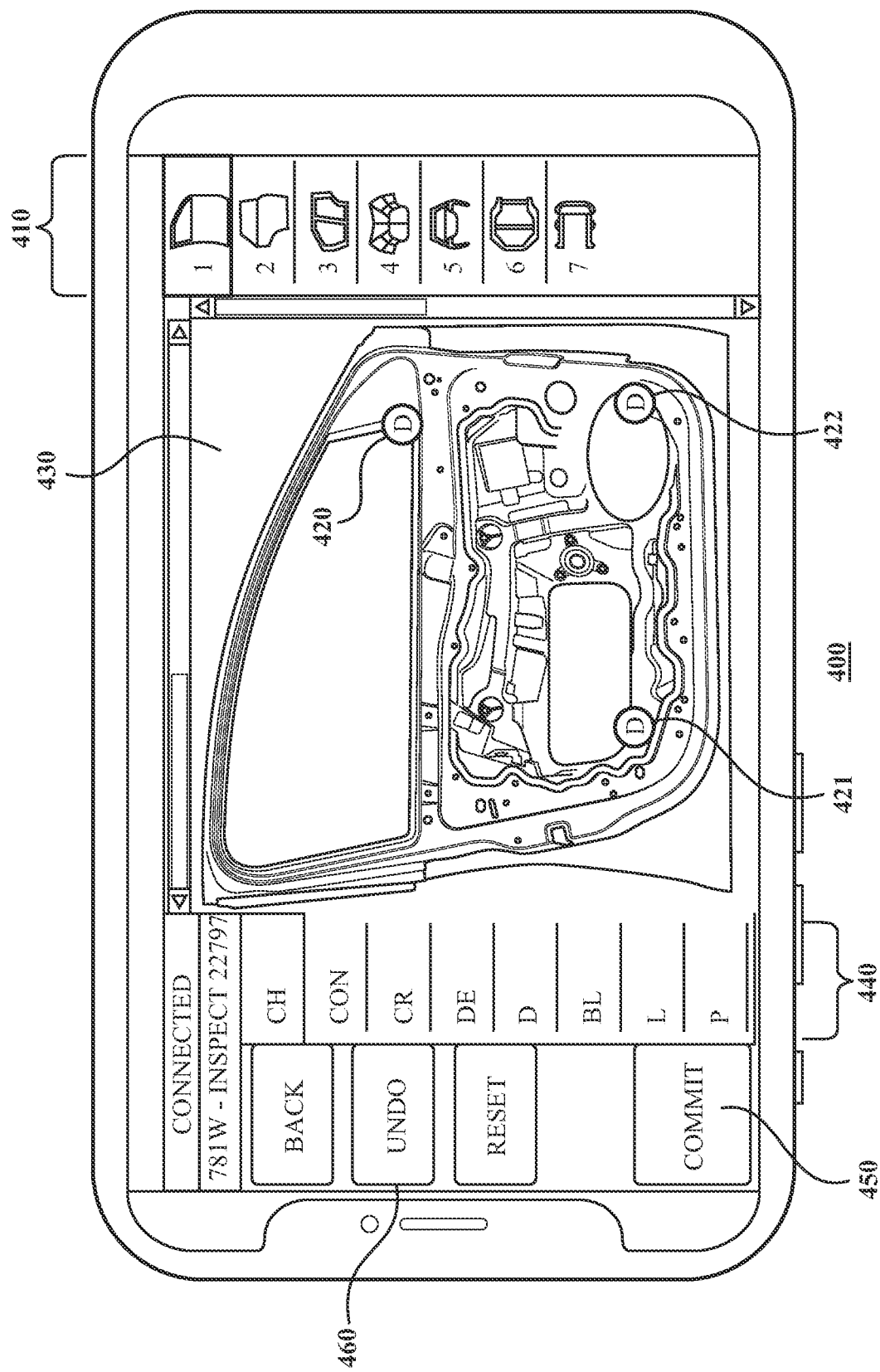
FIG. 4 illustrates one embodiment of an inspection interface of a mobile computing device according to the disclosed embodiments.

FIG. 4 shows an example inspection interface 400 of the inspect function 340. The inspection interface 400 is configured to receive entry of defects in the selected vehicle by the team member. In one or more embodiments, the inspection interface 400 is configured to facilitate the following process for adding defects:

a) Obtain multiple images (also referred to as 'pages') that provide various views of the vehicle and/or parts of the vehicle and receive a selection by the team member of which page they want to mark a discrepancy on. For example, FIG. 4 shows seven selectable, numbered pages 410, with page 1 being selected.

b) Provide a zoomable canvas 430 of an image on a page and receive an input from the team member in the exact location the team member wants the discrepancy to be placed in.

c) Show a visible indicator of the discrepancy (e.g., a circle, a 'x', a question mark, etc.), and provide the team member with a list 440 of choices of all the types of discrepancies (e.g., dent, scratch, etc.) that can be added to the marked location of the canvas. When the team member selects a type of discrepancy, change the visible indicator into an alias indicator 420 of the discrepancy.

d) Provide an option for the team member to choose another location and on the canvas with the last used discrepancy already preset if the location is configured to allow for that same discrepancy, thereby allowing the team member to 'rapidly' enter discrepancies (e.g., 421, 422) on all locations where this discrepancy exists.

e) Provide an option for the team member to change the discrepancy to a different type, prior to clicking on another location, by choosing a different discrepancy from the list 440.

f) Store all entered discrepancies in a 'commit' queue. Creating a commit queue allows the team member to inspect vehicles even while disconnected from WIFI.

g) At any time prior to the team member clicking commit 450, provide the team member with an option to click undo 460 to undo the last discrepancy added to the current active page, or undo all discrepancy added to all vehicle pages.

h) Once the team member commits, all discrepancies are confirmed as defects and sent to the main server database 150 to be stored in association with the corresponding vehicle record.

In one or more embodiments the inspect function 340 sets a maximum number of defects a team member will be allowed to add to a single vehicle. The maximum number cap ensures the commit process will not be slowed down from attempting to enter too many defects. If a team member has added too many defects and tries to commit, the inspect function 340 will prompt the team member to remove defects until the count is less than the maximum number.

Figure 5:
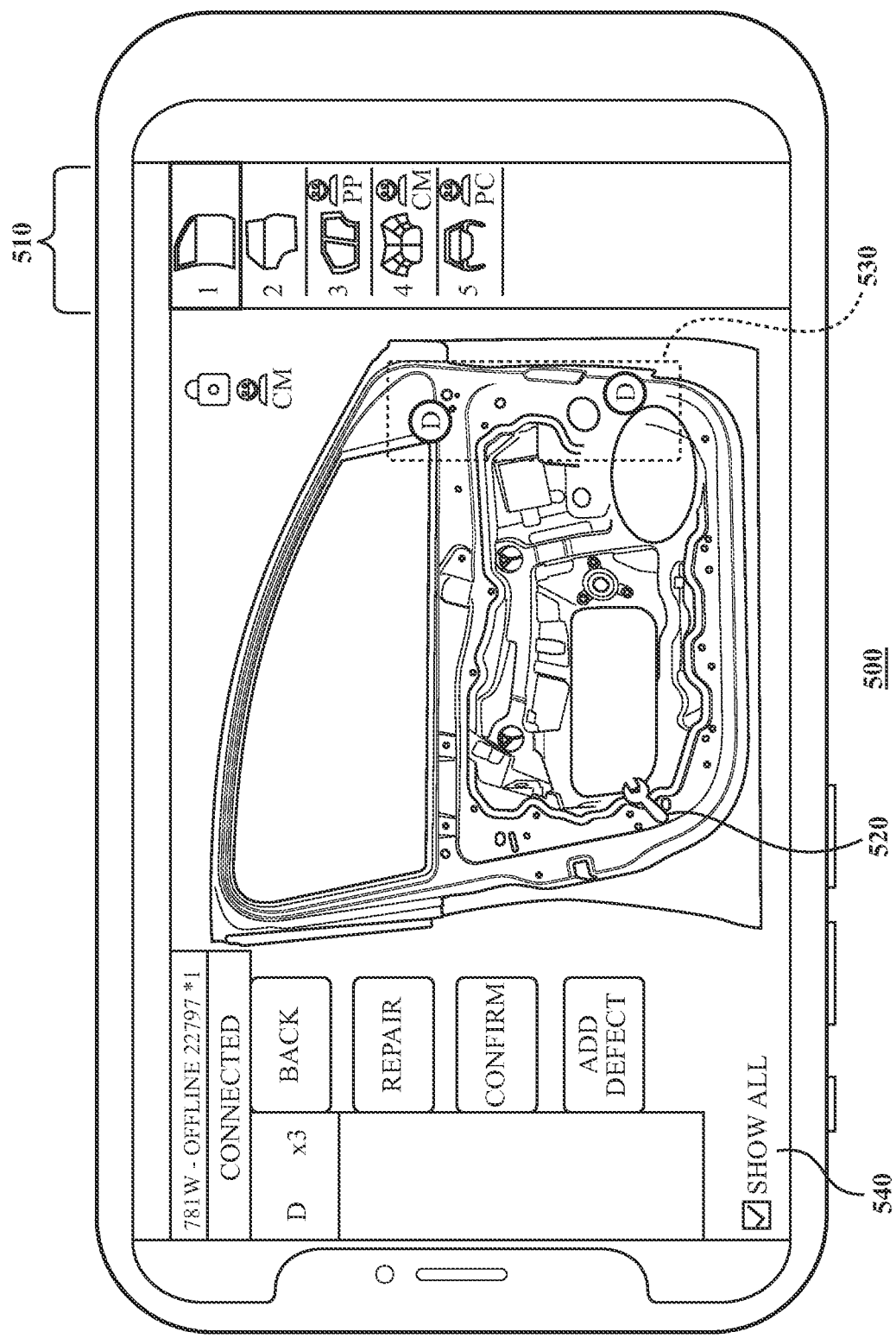
FIG. 5 illustrates one embodiment of an inline repair interface of a mobile computing device according to the disclosed embodiments.

The inline repair function 350 provides an interface that shows currently marked defects on a selected vehicle and allows a team member to quickly address and update the status of the defects while the vehicle is still on the conveyor line. FIG. 5 shows an example inline repair interface 500. Pages 510 (i.e., pages 1-5) that contain marked defects 420 are available for selection. In one or more embodiments, the inline repair interface 500 provides real-time feedback of defects being repaired to improve performance and eliminate collision of tasks. The inline repair function 350 allows a team member to do one or more of: 1) update a marked defect status to repaired, 2) confirm a marked defect is actually within vehicle specification and therefore a non-defect, and 3) tag a defect as not repairable by inline repair, thereby flagging the vehicle with an offline tag 520 for offline repair.

In one or more embodiments, the inline repair function 350 can facilitate collaborative repair in a collaboration mode. To trigger collaboration mode, multiple team members can select the same vehicle in their mobile computing device clients and enter the inline repair mode. When multiple clients in a section enter inline repair mode, the local hub creates a 'repair' group for the selected vehicle, to which the multiple clients subscribe and establish connections. Each repair group is based on unique vehicles and has clients subscribed to it.

In one or more embodiments, the local hub is configured to execute a look up in real-time every X seconds (e.g., 5 seconds, a configurable amount) of all the vehicles in repair groups and sends vehicle record information about all defects logged on the vehicles to all clients subscribed to each respective vehicle. While repair group team members review a selected vehicle in inline repair mode, their mobile computing device clients are automatically updated with all the latest defect status every X seconds, or when defect status are changed by a mobile computing device client of another team member, whichever occurs first. Any team members repairing the same vehicle will be identified on the device screen beside the defect pages list 510, e.g., with their name or initials. The inline repair function 350 actively tracks and updates the identification icons to inform the team member who else is looking at fixing issues on the same vehicle, allowing multiple team members to collaborate in real-time and work together to quickly fix the problems.

In one or more embodiments, team members can select multiple defects by dragging on the page to create a selection box 530. Any defect captured in the selection box 530 can be chosen by quick repair to mark the defect as 'repaired', or 'in spec' to mark it as within specification, or flag it for offline.

If a team member flags a defect on a vehicle for offline review, this information is not sent to the main server 140, but instead the local hub 120 will retain the information in a local cache until the vehicle is no longer in the vehicle queue.

When a team member marks a defect as 'repaired', the inline repair function 350 transmits this information to the local hub 120 and in the next update the defect automatically will no longer appear in the pages associated with the vehicle. Similarly, all other team members with a mobile computing device having the same vehicle loaded in inline repair mode will receive updates from their respective subscriptions to the repair group and the defect marked as repaired will no longer appear on their screens. To eliminate race conditions, in one or more embodiments the local hub 120 can immediately transmit a notification to all team member client devices in a repair group when a team member repairs a defect. This notification can be executed faster than the periodic update, i.e., the local hub 120 can directly transmit the notification in between updates. When all defects are marked as repaired from a page, then the mobile computing device client will no longer show the page in the defect pages list 510.

In one or more embodiments, the inline repair interface 500 can include a 'show-all button' 540 that a team member can click to see a current state of all defects on all pages, including defects that were repaired. Different icons and color combinations can be used to show a state of a defect and whether, for example, it was repaired in line, tagged as within specification or tagged for offline repair.

Any defects in a vehicle marked for offline repair are stored the local hub 120 so that, although the defect information is not saved in the main server 140, any team member who selects the vehicle while it is still in the vehicle queue will be able to get information about the state of the defects.

The offline repair function 360 is used to show any defects that a team member has determined cannot be repaired during inline repair. Vehicles flagged for offline repair are sent off the conveyor line to an offline location for the repair. A defect flagged for offline inspection mode cannot be changed to 'repaired' in inline repair mode, but instead must be addressed in offline repair mode.

Offline repair mode is a hybrid mode that combines inspect mode and inline repair mode with additional functionality. In offline repair mode a team member can switch between modes to add or repair defects. Offline repair mode is not collaborative and will not show indicators of other team members if they are working on the same vehicle. However, offline mode does maintain a connection with the local hub and therefore allows live updates of changes to defect status.

Referring back to FIGS. 1 and 3, the mange gaps function 370 inserts or removes empty vehicles into a vehicle queue to signify physical gaps within the queue. For example, stations 2-1 and 2-2 may operate at a faster speed than station 1-2. In this case, a gap 105 may exist, e.g., behind a vehicle 104 that station 2-1 has already finished inspecting/repairing and allowed to move down the line 115. The local hub 125 will track progress of the gap 105 through the queue the same as a normal vehicle. As this information is only required by mobile devices (e.g., 134-137) in a given section, this information is not saved in the main server database 150 but instead kept in the local hub memory (e.g., 125). In one or more embodiments, the local hub 125 can create a temporary identifier (ID) for the gap 105 based on a current timestamp.

To add a gap, for example, a team member at station 2-1 that observes a gap can select 'manage gap.' In one or more embodiments, in response the mobile computing device 130 can display options to 'add a gap' or 'remove a gap.' When the team member selects 'add a gap', the mobile computing device 130 can include a gap (e.g., the gap 105) in the vehicle queue 310, e.g., insert an icon labelled 'GAP', to show the team member where the gap will be added. The mobile computing device 130 can request the team member confirm the gap submission. Upon receiving confirmation, the mobile computing device 130 transmits the gap information, including timestamp and vehicle queue position, to the local hub 125. In response, the local hub 125 can update the vehicle queue to include the gap 105 and send a confirmation to the mobile computing device 130 indicating that the gap 105 has been added. The local hub 125 can further broadcast the updated vehicle queue including the gap 105 to all mobile computing devices in the section on the next scheduled interval. The manage gaps function 370 can provide similar, inverse functionality for removal of a gap.

Thus, the disclosed defects entry system 100 provides systems and other embodiments that improve rapid entry and tracking of product defects in an inspection line, improves seamless collaboration among team members, and improves data storage and transmission through the use of local hubs that store locally relevant information, such as gap information and offline information.

In one or more embodiments, the disclosed system includes a server having a database configured to store a plurality of records that respectively correspond to a plurality of products in an inspection line, a mobile computing device configured to receive user input indicating a location of a defect on a selected product among the plurality of products, and a local hub, in communication with the server, that receives the user input from the mobile computing device and updates a record among the plurality of records that corresponds to the selected product to include a defect indication in accordance with the user input.

The local hub can select a portion of the plurality of records to create a queue list, and the mobile computing device can establish an ongoing connection with the local hub to receive, based at least in part on an assigned position of the mobile computing device on the inspection line, a recurring transmission of at least a portion of the queue list. The local hub can periodically update records in the queue list in accordance with multiple user inputs received from a subscriber group of mobile computing devices that includes the mobile computing device and transmit the updated records to the subscriber group of mobile computing devices.

The mobile computing device can execute an inspection function that displays an interface for selecting products and for receiving the user input indicating the location of the defect on the selected product.

Furthermore, the mobile computing device can execute an inline repair function that displays an interface for displaying the defect indication and receive a second user input to change a status of the defect indication to indicate one of: the defect has been repaired, the defect is within specification, or the defect cannot be addressed in the inspection line. The inline repair function can include a collaboration mode that displays an indication that a second user is utilizing a second mobile computing device that is simultaneously displaying the selected product and shows a visual indication when the second user inputs an indication of another defect.

The mobile computing device can also execute an offline repair function that displays an interface for displaying information related to defect indications that cannot be addressed in the inspection line. The information related to defect indications that cannot be addressed in the inspection line is not stored in the server but is instead stored in the local hub.

In addition, the mobile computing device can execute a gap management function that receives a gap input that indicates a gap in the plurality of products on the inspection line. Information related to the gap input is not stored in the server but is instead stored in the local hub.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A defects management system, comprising:
    a server, including a database configured to store a plurality of records that respectively correspond to a plurality of products in an inspection line;
    a mobile computing device configured to:
        receive user input indicating a location of a defect on a selected product among the plurality of products;
        execute an inline repair function that displays an interface for displaying a defect indication, wherein the inline repair function includes a collaboration mode that displays an indication that a second user is utilizing a second mobile computing device that is simultaneously displaying the selected product and shows a visual indication when the second user inputs an indication of another defect; and
        receive a second user input to change a status of the defect indication to indicate one of: the defect has been repaired, the defect is within specification, or the defect cannot be addressed in the inspection line; and
    a local hub configured to:
        communicate with the server to receive the user input from the mobile computing device;
        update a record, among the plurality of records, that corresponds to the selected product to include the defect indication in accordance with the user input;
        receive, from the mobile computing device, at least one of first information or second information, the first information indicative that the defect is a type of defect that requires an offline review, the second information indicative of a physical gap among the plurality of products in the inspection line; and
        refrain from sending, to the server, the at least one of the first information or the second information.

2. The defects management system of claim 1, wherein: the local hub is further configured to:
    receive, from the mobile computing device, third information, the third information being different from the first information and the second information;
    send, to the server, the third information; and
    process, at the local hub, the at least one of the first information or the second information so that there is a lack of an existence of a reason to send the at least one of the first information or the second information to the server; and
    a refrainment from sending, to the server, the at least one of the first information or the second information reduces a latency in a performance of the defects management system.

3. The defects management system of claim 2, wherein the local hub is configured to select a portion of the plurality of records to create a queue list, and the mobile computing device is configured to establish an ongoing connection with the local hub to receive, based at least in part on an assigned position of the mobile computing device on the inspection line, a recurring transmission of at least a portion of the queue list.

4. The defects management system of claim 3, wherein the local hub is configured to periodically update records in the queue list in accordance with multiple user inputs received from a subscriber group of mobile computing devices that includes the mobile computing device and to transmit updated records to the subscriber group of mobile computing devices.

5. The defects management system of claim 2, wherein the mobile computing device is configured to execute an inspection function that displays an interface for selecting products and for receiving the user input indicating the location of the defect on the selected product.

6. The defects management system of claim 2, wherein the mobile computing device is configured to execute an inline repair function that displays an interface for displaying a defect indication and to receive a second user input to change a status of the defect indication to indicate one of: the defect has been repaired, the defect is within specification, or the defect cannot be addressed in the inspection line.

7. The defects management system of claim 2, wherein the local hub is associated with a section of the inspection line and is further configured to determine a queue of a portion of the plurality of products associated with the section, the queue having a size.

8. The defects management system of claim 7, wherein the local hub is further configured to obtain, from the server, records associated with products included in the queue.

9. The defects management system of claim 8, wherein the local hub is further configured to refrain from obtaining, from the server, records unassociated with the products include in the queue.

\* \* \* \* \*